United States Patent [19]

Kernion et al.

[11] Patent Number: 4,521,357
[45] Date of Patent: Jun. 4, 1985

[54] CARBON BONDED REFRACTORIES

[75] Inventors: Mark C. Kernion, N. Braddock; Albert L. Renkey, Bridgeville, both of Pa.

[73] Assignee: Dresser Industries, Inc., Dallas, Tex.

[21] Appl. No.: 490,816

[22] Filed: May 2, 1983

[51] Int. Cl.³ .............................................. C04B 35/52
[52] U.S. Cl. ...................................... 264/63; 501/101
[58] Field of Search ........................... 501/101; 264/63

[56] References Cited

U.S. PATENT DOCUMENTS

| 4,102,694 | 7/1978 | Sasaki et al. | 501/101 |
| 4,184,883 | 1/1980 | Hughes et al. | 106/56 |
| 4,210,453 | 7/1980 | Bowers | 501/101 |
| 4,216,020 | 8/1980 | Watanabe et al. | 106/56 |
| 4,292,082 | 9/1981 | Danjys et al. | 501/101 |
| 4,306,030 | 12/1981 | Watanabe et al. | 501/101 |
| 4,431,744 | 2/1984 | Kernion et al. | 501/101 |
| 4,431,745 | 2/1984 | Watanabe et al. | 501/101 |

FOREIGN PATENT DOCUMENTS 869673  12/1978  Belgium .

Primary Examiner—Mark Bell
Attorney, Agent, or Firm—Barry E. Deutsch

[57] ABSTRACT

Refractory brick comprising a refractory aggregate, carbonaceous material and powdered metal bonded with a combination of liquid thermosetting resin and impregnating pitch.

3 Claims, No Drawings

CARBON BONDED REFRACTORIES

Tars and pitches have been used as binders for refractory aggregates for some time and this type brick has found wide usage in basic oxygen steelmaking furnaces, electric arc steelmaking furnaces, and iron and steel ladles. The tars and pitches serve not only to bond the aggregates together during the manufacturing process, but when the brick are heated in a steelmaking furnace, the pitch decomposes and carbon is deposited within the pore structure of the brick and around the refractory aggregate. This carbon residue, resulting from pyrolysis of the pitch or tar at high temperature, forms a strong carbon bond between the refractory aggregates and imparts excellent corrosion resistance to the slag formed in the steelmaking processes. The refractory aggregate in the brick may vary, but typically is magnesite, dolomite or aluminous materials.

The techniques used in the manufacture of tar or pitch bonded refractories have been well established. For example, a size graded batch of refractory grain is intimately mixed with pitch and other carbonaceous materials at 250° to 300° F. The resulting mixture is formed into shapes on a brick press. As the brick cools, the pitch solidifies and forms a strong bond. Since tars and pitches are not thermosetting materials, they will again melt and soften and cause the brick to become very weak in the 200° to 600° F. temperature range. If brick of this type were used in a large BOF or a ladle, the brick would be subject to fragmental breaking, spalling and undesirable subsidence during the burn-in or preheating period. Attempts to overcome this problem include the addition of various materials such as sulfur to the mix or baking the brick at higher temperatures than used in mixing or pressing the brick batch. Both of these methods are intended to polymerize the pitch resulting in a more viscous bond in the refractory. However, neither method is entirely satisfactory as the sulfur reacts with the pitch giving off toxic hydrogen sulfide fumes that must be collected prior to entering the atmosphere and high temperature baking must be done in a furnace capable of operating at temperatures considerably higher than is normally available in refractory plants.

In refractory plants, drying or baking furnaces normally operate at 300° F. to 400° F. When pitch bonded brick are baked in this temperature range, their modulus of rupture at 400° F. is in the 100 to 300 psi range. Increasing the baking temperature to 500° F. in the laboratory only increased the modulus of rupture at 400° F. to 370 psi. The strength is judged totally inadequate. Therefore, baking the brick to increase strength in this critical low temperature range is not an entirely satisfactory answer to the problem.

In order to eliminate the problems associated with the softening of pitch bonded brick in the temperature range of 200° to 600° F., resin binders have been sought as substitutes. Resins have been used because they cannot only function as a pitch does in a brick mix in reference to binding the refractory aggregate during molding and yielding a substantial amount of carbon upon pyrolysis, but can also cure to a thermoset material. The ability of a resin to cure to a thermoset material eliminates the problem of the binder softening in the 200° to 600° F. temperature range.

While the use of resins solves the strength problem at low temperature, brick bonded with resins do not exhibit a strengthening affect above 600° F. as pitch bonded brick do. Refractory strength above 600° F. in a steelmaking furnace is very important as the brick are subject to the impact of steel scrap and hot metal as they are charged to the furnace as well as erosion from particles entrained in fast moving gases used in steel production.

Accordingly, it is the object of this invention to take advantage of the strength characteristics derived in a refractory from the use of both a resin and a pitch bond.

This and other objects are attained in a refractory bonded with a thermosetting resin binder and curing agent (if needed) pressed into brick, baked at a temperature to thermoset the resin, and then impregnated with a tar or pitch.

Briefly, in accordance with the invention, there is provided carbon bonded refractory brick. The brick comprise about 1 to 6% by weight, liquid thermosetting resin, up to about 20%, by weight, carbonaceous material, up to about 10%, by weight, of one or more powdered metals, and the balance at least 70%, but less than 100%, by weight, refractory aggregate.

The resins which might be used include phenolic types (novolaks and resols), furan types, lignin modified phenolics, resorcinol-formaldehydes and polyhydroxyl-polyphenyl types to name a few. Along with a curing agent, if necessary, the balance of the mix is comprised of a composite filler, which is defined as a mixture of at least: (1) about 70% refractory aggregates such as magnesia, dolomite, alumina, silica, aluminum silicates, zircon, clay and spinel; (2) less than about 20% carbonaceous material such as carbon black, flake graphite, amorphous graphite and calcined anthracite coal, to name a few; and (3) less than about 10% powdered metals such as silicon, magnesium or aluminum either alone or in combination. Those skilled in the art will recognize that all components of the composite filler cannot be simultaneously used in a single refractory. Certain combinations of aggregates such as magnesia and aluminum silicate, dolomite and clay or magnesia and silica will react at elevated temperatures to form compounds and eutectics with undesirable low melting points. However, alumina and aluminum silicates, magnesia and dolomite, magnesia and zircon and other combinations could be used in a manner without the problem of forming non-refractory compounds. All the cabonaceous materials are compatible, but it would be unlikely they would all be used together. However, all the powdered metals could be used in a single refractory if desired.

To manufacture a refractory brick, the resin, curing agent (if necessary) and the composite filler of the desired composition are blended together as in the common practice for producing such brick, pressed to form the shape, and baked in an oven normally at about 300° to 400° F. to cure the resin. After baking the brick, tar or pitch is introduced into the brick through impregnation. The baking of the brick is not only important because of the increased strength that the refractory obtains from the curing of the resin, but also because of the opening of the pore structure due to the curing reaction and loss of the liquid carrier of the resin. The amount of opened structure after baking at a relatively low temperature is important because this determines the amount of pitch that can be impregnated into the refractory.

Impregnation of the brick with tar or pitch is achieved by placing the preheated resin bonded brick into a heated vacuum chamber. The chamber is evacuated, removing all the air from the pore spaces of the brick. Molten tar is pulled into the vacuum chamber to totally surround the evacuated brick. A positive pressure is then introduced to the chamber forcing the surrounding pitch into the pore spaces of the brick. After the brick is fully impregnated, the excess tar is removed from the chamber followed by removal of the brick. The preferred pitch for impregnation is 240° F. petroleum pitch, although lower or higher softening point coal tar or petroleum pitches may be used, but preferably ones which have a quinoline insoluble content low enough not to form a thick pitch skin on the brick.

Many different thermosetting resins can be used in this invention, but it must have an essential property that when pyrolysis occurs in service, carbon will be deposited within the pores and around the grains of the composite filler forming a strong carbon bond. It is preferred that the resin is a liquid at room temperature. The solids content of the resin that can be used in this invention may range from 30 to 90%, but the preferred solids content, however, should be in the 50 to 80% range. If the solids content of the resin is too low, the brick will not have sufficient green strength after pressing while if the solids content of the resin is too high the resin will become viscous, hard to work with, and will not leave sufficient open porosity to allow the brick to be pitch impregnated after baking.

A variety of curing agents can be used depending on the resin that is used. Agents that may be used include hexamethylenetetramine, paraformaldehyde, formalin, triethanolamine and acetal resin to name a few. The curing agent that is selected must be effective in the curing operation and in the eventual pyrolysis of the resin into a carbon bond.

The essence of the present invention will be apparent from the following examples which constitute the best presently known mode for the production of such carbon bearing brick.

EXAMPLES I TO III

Carbon bonded refractories, which have primary use in basic oxygen steelmaking furnace, were prepared from a batch made up of 100 parts dead burned magnesite, ranging from −2 mesh to ball mill fines, 3.8 parts carbon black, 3.6 parts resin (the polyhydroxy-diphenyl type at a 65% content of resin solids), and 0.28 parts hexamethylenetetramine. The batch was mixed in a high intensity Eirich mixer. All of the material was charged into the mixer at one time and mixing occurred for 5 minutes. Brick pressed from this batch were tempered in an oven at 400° F. with a hold time of 3 hrs. The brick were then impregnated with 240° F. petroleum pitch in an impregnating vessel. The refractories produced from this mix were tested and their properties are set forth in Table I as Example I. For comparison purposes, the equivalent properties of resin bonded, Example II, and tar bonded brick, Example III, are shown in Table I also.

TABLE I

| | Mix Designation: | | |
|---|---|---|---|
| | Example I Tar Impregnated/Resin Bonded Brick | Comparative Example II Resin Bonded Brick | Comparative Example III Resin Bonded Brick |
| Mix: | | | |
| Deadburned Magnesite | 100 | 100 | 100 |
| Polyhydroxy-Diphenyl Resin | 3.8 | 3.8 | — |
| Hexamethylenetetramine | 0.28 | 0.28 | — |
| Carbon Black | 3.6 | 3.6 | 2.8 |
| Coal Tar Pitch | — | — | 3.2 |
| Sulfur | — | — | 0.74 |
| Mixer: | High Intensity Eirich Mixer | | |
| Impregnated with 240° F. Petroleum Pitch: | Yes | No | No |
| Bulk Density, pcf | 196 | 193 | 194 |
| Modulus of Rupture, psi | | | |
| At Room Temperature | 2790 | 1890 | 1380 |
| At 200° F. | 2320 | 1330 | 790 |
| At 400° F. | 1440 | 1350 | 280 |
| At 600° F. | 1160 | 1240 | 590 |
| At 800° F. | 1250 | 1000 | 1610 |
| At 1000° F. | 2360 | 1020 | 1880 |
| Crushing Strength at 2800° F.* | 3620 | 2590 | 2000 |
| Coked Porosity, % | 8.89 | 9.79 | 8.7 |
| Residual Carbon, % | 5.65 | 5.36 | 4.86 |

*Reducing conditions

The results in Table I show that Example I, according to this invention, surpasses the comparative Examples II and III in the tests that were made as follows:

1. Example I has a superior modulus of rupture profile over the critical temperature range of 200° F. to 1000° F. This is particularly true comparing Examples I and II over the temperature range of 800° F. to 1000° F. when the polymerization of the pitch occurs.

2. The crushing strength under reducing conditions at 2800° F. is increased with the tar impregnation of the resin bonded brick.

3. Tar impregnating resin bonded brick lowers the coked porosity and increases the residual carbon.

EXAMPLES IV TO XIII

Mix compositions as shown in Table II were prepared. The batches were mixed in a Lancaster low intensity mixer, pressed, and then baked at 400° F. Examples IV through VIII were tar impregnated by the vacuum pressure method. Examples IX through XIII were duplicates of samples IV through VIII, except they were not tar impregnated. Examples IX through XIII were tested in comparison with samples IV through VIII to show the effect of tar impregnation on the strength of the brick in the 200° F. to 1000° F. range.

TABLE II

| Examples No. | IV & IX | | V & X | | VI & XI | | VII & XII | | VIII & XIII | |
|---|---|---|---|---|---|---|---|---|---|---|
| Mix: | | | | | | | | | | |
| Magnesite | 93.5 | | 70 | | | | | | 100 | |
| Alumina | | | | | 85 | | | | | |
| 70% Alumina | | | | | | | 83 | | | |
| Carbon Black | 3.5 | | | | | | | | | |
| Flake Graphite | | | 20 | | 10 | | | | | |
| Amorphous Graphite | | | | | | | 10 | | | |
| Clay | | | | | | | 5 | | | |
| Aluminum Powder | 1.5 | | 5 | | 5 | | | | | |
| Magnesium Powder | 1.5 | | | | | | | | | |
| Silicon Powder | | | 5 | | | | 2 | | | |
| Bond Additions: | | | | | | | | | | |
| Phenol Formaldehyde Resin A | 3.8 | | | | | | | | | |
| Phenol Formaldehyde Resin B | | | | | 3.5 | | | | 3.2 | |
| Polyhydroxy-diphenyl Resin | | | 4.1 | | | | 4.5 | | | |
| Hexamethylenetetramine | 0.24 | | 0.30 | | 0.25 | | 0.35 | | 0.23 | |
| Tar Impregnated | Yes | No | Yes | No | Yes | No | Yes | No | Yes | No |
| Bulk Density, pcf: | 188 | 187 | 174 | 172 | 188 | 185 | 162 | 158 | 193 | 191 |
| Modulus of Rupture, psi | | | | | | | | | | |
| At Room Temperature: | 3430 | 2520 | 1670 | 1280 | 3340 | 2670 | 2070 | 950 | 5080 | 4270 |
| At 200° F. | 3450 | 1580 | 2200 | 1280 | 2730 | 2370 | 2040 | 830 | 4560 | 3580 |
| At 600° F. | 1050 | 760 | 620 | 820 | 890 | 1000 | 690 | 400 | 2200 | 1620 |
| At 1000° F. | 1960 | 440 | 1640 | 1010 | 1580 | 1030 | 1950 | 690 | 2600 | 1670 |

The results in Table II show that this invention is applicable when using composite fillers of widely different amounts and compositions, different carbon amounts and compositions, different metal amounts and compositions and different resin binders.

Comparing the results in Table II of Example XIII, which contains no carbonaceous addition, with other examples demonstrates that the carbonaceous material adversely affects the modulus of rupture in the room to 1000° F. temperature range. However, for the refractory to resist corrosion and the absorption of slag, an addition of a carbonaceous material is mandatory. As can be noted, the resin bond followed by pitch impregnation goes a long way in overcoming the adverse effect of the carbonaceous addition on strength particularly at the 1000° F. temperature level.

In Table III below, is shown the chemical analyses of the various refractories and carbon containing materials.

TABLE III

| CHEMICAL ANALYSIS | | | | |
|---|---|---|---|---|
| | Magnesia | Alumina | 70% Alumina | Clay |
| (Calcined Basis) | | | | |
| Silica ($SiO_2$) | 0.8% | 0.1% | 26.4% | 62.1% |
| Alumina ($Al_2O_3$) | 0.2 | 99.6 | 69.3 | 31.8 |
| Iron Oxide ($Fe_2O_3$) | 0.2 | 0.2 | 1.0 | 2.5 |
| Titania ($TiO_2$) | 0.01 | 0.01 | 3.2 | 1.5 |
| Lime (CaO) | 2.3 | 0.04 | 0.02 | 0.7 |
| Magnesia (MgO) | 96.5 | 0.04 | 0.04 | 0.7 |
| Total Alkalies | — | 0.05 | 0.07 | 0.7 |
| LOI (Dry Basis) | | | | 10.4 |

TABLE III-continued

| CHEMICAL ANALYSIS | | |
|---|---|---|
| | Flake Graphite | Amorphous Graphite |
| (Dry Basis) | | |
| Silica ($SiO_2$) | 6.7% | 9.1% |
| Alumina ($Al_2O_3$) | 3.2 | 3.7 |
| Iron Oxide ($Fe_2O_3$) | 1.1 | 1.6 |
| Titania ($TiO_2$) | 0.05 | 0.22 |
| Lime (CaO) | 0.62 | 0.84 |
| Magnesia (MgO) | 0.23 | 0.32 |
| Total Alkalies | — | 0.62 |
| Carbon (c) | 88.1 | 83.6 |

Having thus described the invention in detail and with sufficient particularity as to enable those skilled in the art to practice it, what is desired to have protected by Letters Patent is set forth in the following claims.

The embodiments of the invention in which an exclusive property or privilege is claimed are defined as follows:

1. Method of making carbon bonded refractory brick consisting essentially of mixing about 1 to 6%, by weight, carbonaceous liquid thermosetting resin, up to about 20%, by weight, carbonaceous material, up to about 10%, by weight, of one or more powdered metals selected from the group consisting of silicon, magnesium and aluminum, and at least 70%, but less than 100%, by weight, refractory aggregate, pressing the mixture to form shapes, baking the shapes to cure the resin and impregnating the shapes with tar or pitch.

2. Method of claim 1 in which the shapes are baked at a temperature between about 300° and 400° F.

3. Method of claim 1 in which the shapes are impregnated under vacuum.

* * * * *